United States Patent [19]

Olson, Sr. et al.

[11] 3,763,789

[45] Oct. 9, 1973

[54] CONVERTIBLE RAIL-HIGHWAY VEHICLE

[75] Inventors: Buford W. Olson, Sr.; Eldrid W. Nelson; Albin A. Davidson, all of Minneapolis, Minn.

[73] Assignee: Chas. Olson & Sons, Incorporated, Minneapolis, Minn.

[22] Filed: July 19, 1972

[21] Appl. No.: 273,295

[52] U.S. Cl............... 105/215 C, 104/242, 104/245
[51] Int. Cl...... B61d 15/00, B61f 9/00, B62d 61/12
[58] Field of Search................. 105/215 C; 104/242, 104/245

[56] References Cited
UNITED STATES PATENTS

| | | | |
|---|---|---|---|
| 2,030,311 | 2/1936 | Messick | 105/215 C |
| 2,039,489 | 5/1936 | Messick | 105/215 C |
| 2,140,421 | 12/1938 | Fageol | 105/215 C |
| 2,986,102 | 5/1961 | Cox | 105/215 C |
| 3,645,211 | 2/1972 | Gretzschel et al. | 105/215 C |
| 3,653,332 | 4/1972 | Olson, Sr. et al. | 105/215 C |

*Primary Examiner*—Robert G. Sheridan
*Assistant Examiner*—Howard Beltran
*Attorney*—H. Dale Palmatier

[57] ABSTRACT

A pair of flanged wheels to guide along railroad tracks forming a conversion kit is mounted immediately adjacent the rubber tired wheels of the vehicle. A frame attachable to the body or frame of the vehicle; each of the flanged wheels being mounted on an extensible and retractable mounting arm swingably mounted on the frame and spring pressed to extended position; lifting and lowering arms connected with the flanged wheels and with each other and being slidable along the frame to raise and lower the flanged wheels relative to the track; latching mechanism retaining the wheels in lowered and raised positions.

15 Claims, 9 Drawing Figures

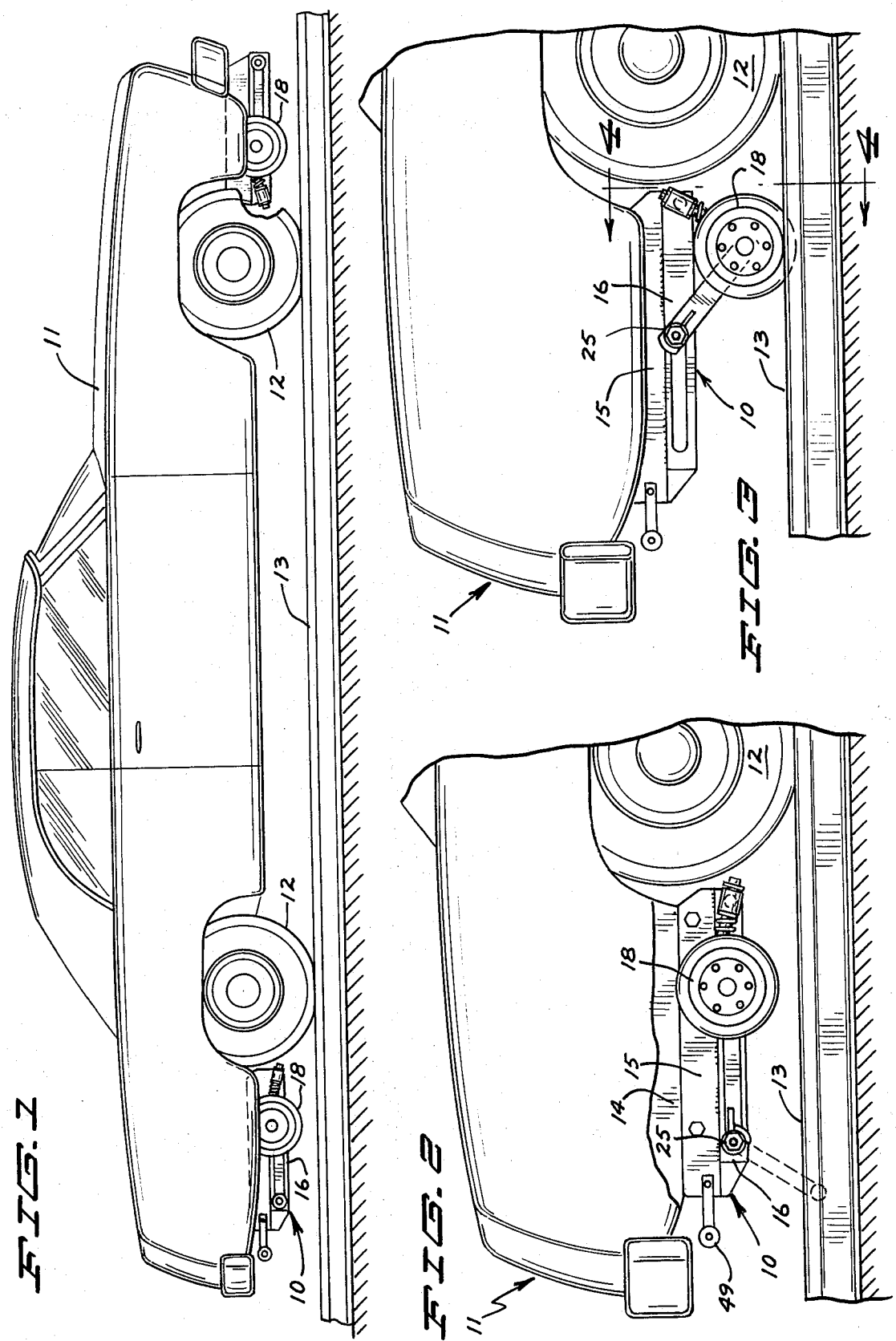

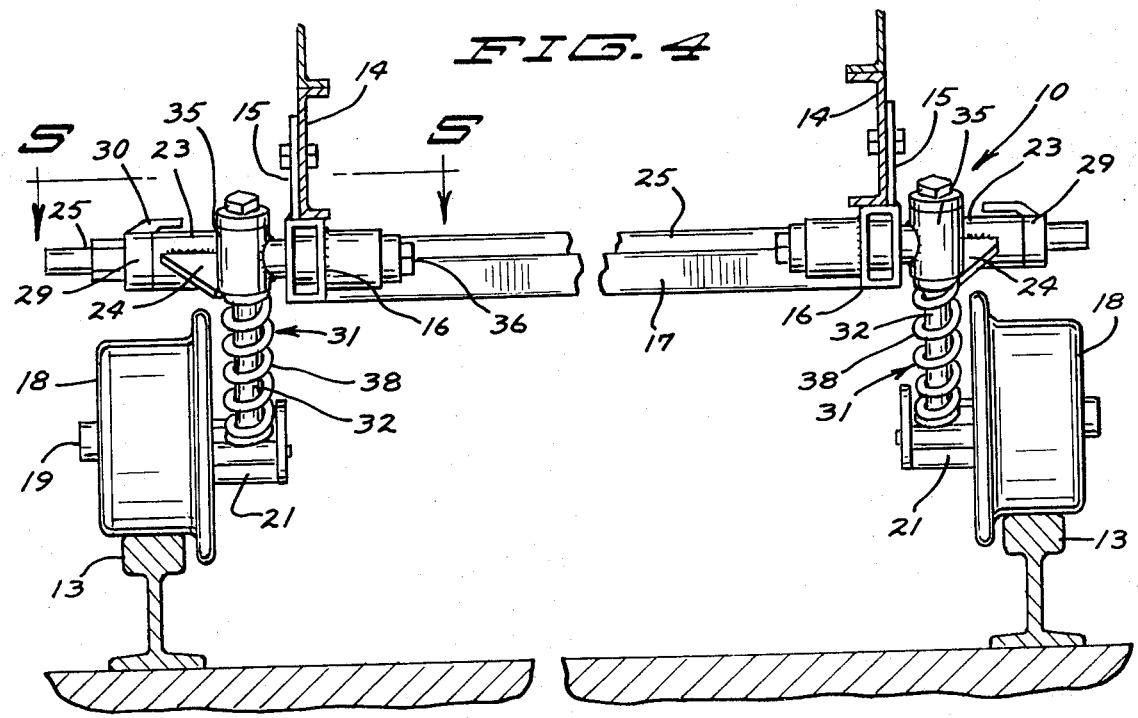
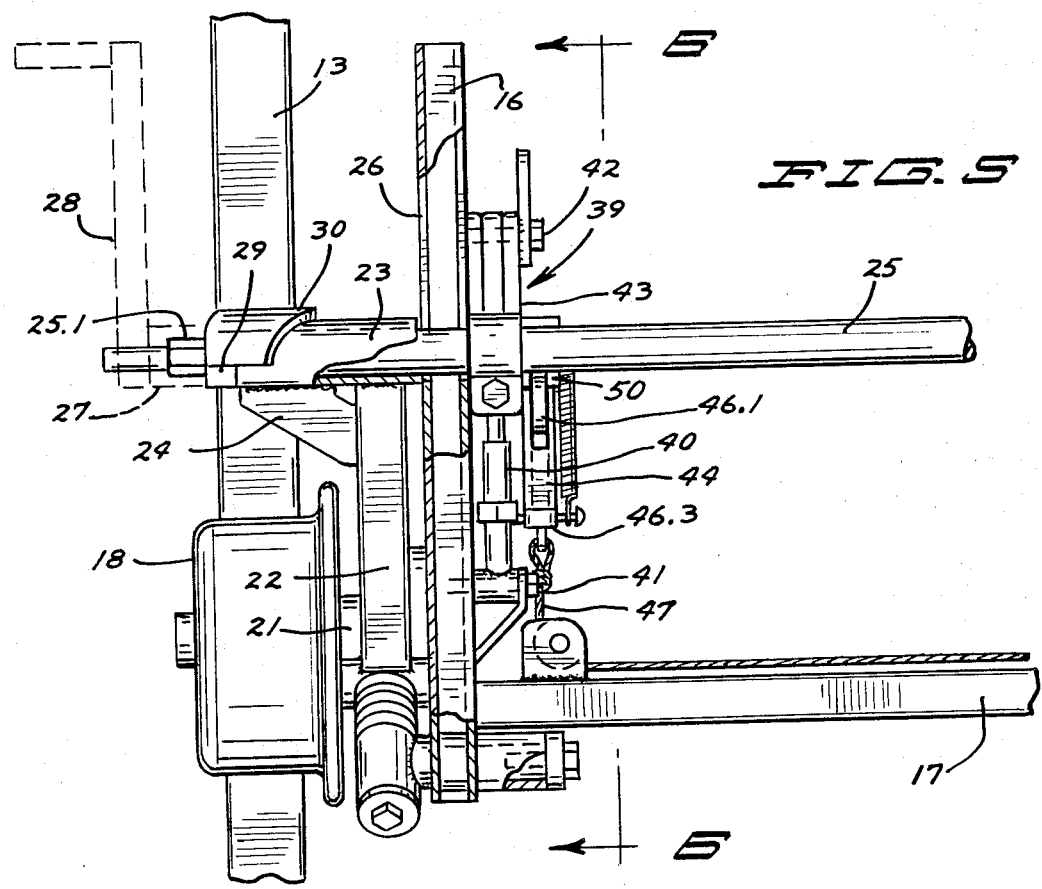

CONVERTIBLE RAIL-HIGHWAY VEHICLE

BRIEF SUMMARY OF THE INVENTION

This rail kit is primarily adapted for attachment to and used with passenger automobiles. This type of vehicle presents particular problems because of the minimum amount of space between the vehicle body or frame and the pavement or ground surface upon which the rubber tired wheels rest or revolve. Of course, it is desirable that the flanged track wheels may be raised and lowered without requiring an excessive amount of effort, and that these flanged wheels will be held in the desired elevated or lowered position in order to accomplish the desired purpose.

The hub of each of the flanged rail wheels is connected to the frame by an articulated linkage including two separate mounting arms. One of the mounting arms is extensible and retractable and is spring pressed into extended position, but will be retractable under the load of the vehicle when the flanged wheel is firmly applied to the track and when irregularities in the track contour are encountered. The other mounting arm to which the hub of each flanged wheel is connected is swingable with respect to the frame and is also slidable along the frame so as to cause a swinging of the extensible and retractable arm and raising or lowering of the flanged wheel relative to the track. The slidable arms are interconnected by a shaft extending transversely across the vehicle frame to obtain coordinated lowering and raising movement of the flanged wheels into and out of operative position and to provide for the proper latching of the flanged wheels in the desired raised or lowered positions.

The articulated linkage and particularly the spring pressed extensible arm thereof causes application of a constant downward pressure at the rail wheel against the track.

The principal motion required to raise or lower the flanged wheel is the rotation of the shaft which interconnects the sliding arms. This rotation of the shaft produces the necessary sliding movement of the slidable arm which causes the articulation of the linkage for either raising or lowering the flanged wheels, depending upon the direction of rotation of the shaft.

When the wheels are in raised position, the latching linkage is shifted into an over-center position so as to retain the wheels in the elevated position, and a latch device is also used to assure the retention of the flanged wheels in elevated position. The same latch device is used to retain the flanged wheels in the lowered position. The latching device therefore has a single release which is readily and easily operable immediately prior to rotating the shaft for lowering or raising the flanged wheels.

BRIEF DESCRIPTION OF THE DRAWINGS

FIG. 1 is a side elevation view of a passenger automobile with the invention applied, there being portions broken away for clarity of detail.

FIG. 2 is a greatly enlarged elevation view of the apparatus as applied to the rear of the vehicle.

FIG. 3 is a view similar to FIG. 2 but illustrating the shifted position of the flanged wheel into engagement with the track.

FIG. 4 is an enlarged elevation view, partly broken away for clarity of detail, and viewing the attachment secured to the automobile substantially as indicated at 4—4 in FIG. 3.

FIG. 5 is an enlarged detail section view showing portions of the apparatus in top plan as indicated at 5—5 in FIG. 4.

DETAILED DESCRIPTION OF THE INVENTION

Figure 6:
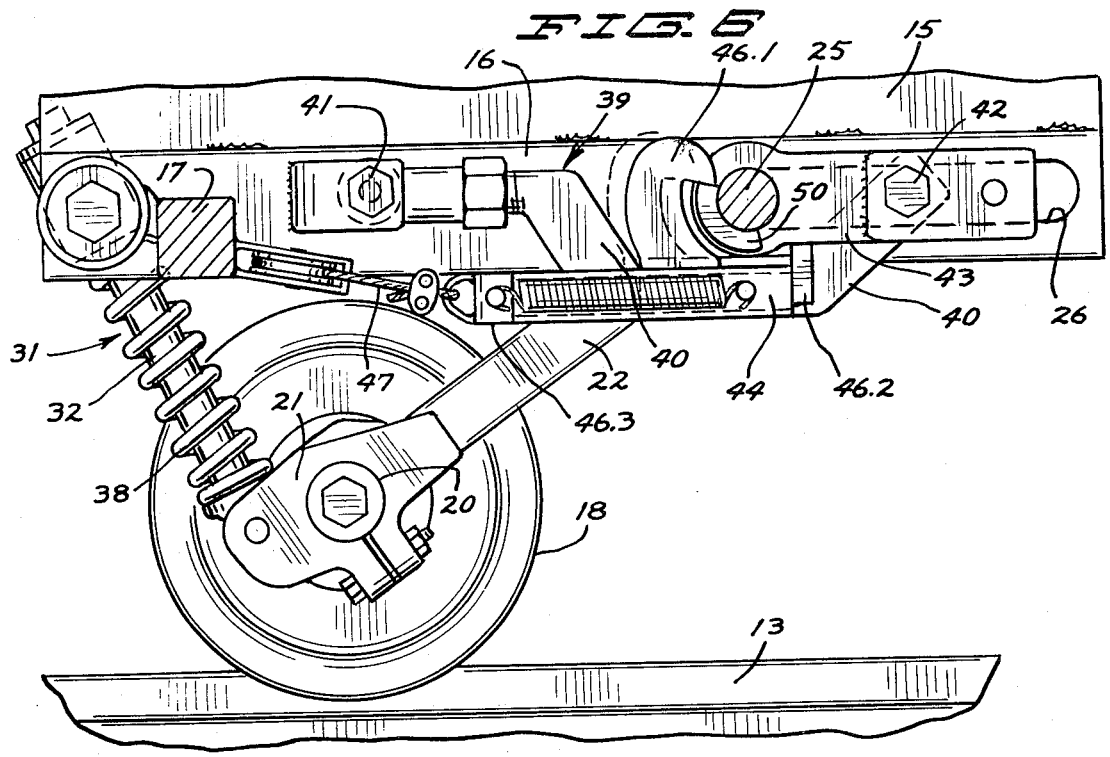
FIG. 6 is an enlarged detail section view taken approximately at 6—6 in FIG. 5 and illustrating the flanged wheel in fully lowered and operative rail position.

One form of the present invention is shown in the drawings and is described herein.

The attachment comprising the present invention is indicated in general by numeral 10 and is shown attached to a passenger automobile which is indicated in general by numeral 11. The vehicle 11 has rubber tired support wheels 12 which normally will run on a road or highway, but which may be run along railroad tracks 13 if they are suitably guided and held in proper relationship to the tracks.

Whereas the attachment 10 must be connected to the frame of the vehicle 11, it is recognized that certain models of passenger automobiles may not have a frame which is completely separate from the body of the vehicle. The attachment 10 will be attached to the integral body-frame, and where herein reference is made to the frame of the vehicle 11, this is intended to include such structure of the automobile which may serve a combined surface as a portion of the frame and body simultaneously and in one part.

The vehicle frame 14 has the mounting plate 15 of the attachment 10 affixed thereto as by bolts or welding. The attachment frame includes a pair of elongate box channels 16 welded to a corresponding mounting plate 15 and oriented in a fore and aft direction of the automobile 11. Each of the frame portions 16 is disposed adjacent one of the support wheels 12 of the vehicle. The attachment 10 will be disposed adjacent the rear wheels 12 at a location immediately to the rear thereof, and adjacent the front wheels 12, immediately forward of these wheels on the vehicle 11.

The frame of the attachment 10 also includes a rigid crossbar 17 extending transversely across the automobile and having its opposite ends affixed as by welding to the longitudinally extending box channel frame portions 16. Because of the integral frame 16, 17, the attachment 10 may be easily assembled onto the frame of the vehicle 11 with a minimum of difficulty.

The attachment 10 also includes a pair of flanged guide wheels 18 oriented so that the flanges of these wheels are disposed along the inner side of track 13. The flanged guide wheels are on stub shafts 19 journaled in suitable bearings carried by bearing holders 20 which are affixed as by clamping in the end portions 21 of support or mounting links 22.

The upper ends of arms or links 22 are provided with sleeve bearings 23 to which the links 22 are affixed as by welding. The sleeves 23 are considerably longer than the width of the arms 22, and a rigid steel plate 24 is welded to both the sleeve 23 and the arm 22 to supply additional bracing.

The sleeves 23 are supported on and rotatable with respect to an elongate transverse shaft 25 which extends transversely of the vehicle 11 and substantially parallel to the frame bar 17. Shaft 25 extends through elongate slots 26 in both of the box channel frames 16 so that the shaft 25 is confined against vertical movement, but may move in a horizontal fore and aft direction. Due to the relationship between shaft 25 and the sleeves 23, the shaft 25 may be rotated while the sleeves 23 are held against rotation. Although the main portion of shaft 25 is cylindrical in shape, the end portion 25.1 of the shaft is hexagonally shaped to telescopically receive the hexagonal wrench socket 27 which may be turned by its wrench handle or crank arm 28 in revolving the shaft 25. A collar 29 is affixed upon the end of shaft 25 adjacent the sleeve 23, and the collars 29 carry lugs 30 which extend endwise from the collars 29 and overlie the sleeves 23. Each of the lugs 30 has one edge which, when the shaft 25 is revolved, will confront and abut against the rigid flange 24 of the adjacent arm or link 22 for the purpose of swinging the arm 22 and flanged wheel 18 upwardly away from the track 13 toward the position illustrated in FIGS. 2 and 8.

The arms or links 22 may be considered sub-frames which are movable with respect to the frame 16 so as to permit vertical movement of the guide wheels 18 so that the guide wheels will follow the undulations in track 13. Although the arms 22 do not have a completely horizontal position, when the wheels 18 are serving the function of guiding the vehicle along the tracks 13, the links or arms 22 are sufficiently horizontally oriented so that undulations in the track will cause the guide wheels 18 to move vertically with respect to the vehicle frame.

A link or arm, indicated in general by numeral 31, is also connected between the lower end of each of the links 22 and the frame 16 to assist in properly locating the guide wheels 18. Each of the arms or links 31 includes a rigid rod 32 affixed to a rigid mounting 33 which is connected by pivot 34 to the lower end of the adjacent arm 22. The upper end of rigid rod 32 is slidably received in a slide bearing 35 which is swingably mounted on the adjacent frame 16 by a retaining bolt 36 which is anchored in the frame 16. A cap screw 37 is threaded into the end of rod 32 and affixes a retainer ring 38' on the end of rod 32 so that the rod 32 is not withdrawn from the slide bearing 35.

Each of the links 31 includes a stiff coil compression spring 38, one end of which bears against the mounting 33 and the other end of which bears against the slide bearing 35 so as to continuously urge the rod 32 in a downward direction. The sliding relationship between rod 32 and slide bearing 35, together with the action of spring 38, effectively causes the link 31 to be a spring-loaded extensible and retractable link which is resiliently yieldable in a longitudinal direction.

The links 31 and 22 cooperate in mounting the flanged guide wheels 18, and the links 31 and 22 cooperatively define an articulated linkage wherein the intermediate proximal portion 21 of this articulated linkage mounts the flanged wheel 18, and the distal ends of the linkage 31, 22 are connected to the frame 16. The one link is extensible and retractable and spring-loaded, and swingably connected to the frame 16 while the distal end of the other link 22 is slidably related to the frame 16 for raising and lowering the flanged wheel.

The attachment 10 is also provided with an operating linkage 39 for moving the shaft 25 along the slots 26 in the frames 16. The operating linkage 39 includes a two-part linkage, one part 40 comprising an elongate link, swingably mounted at bolt 41 to the frame 16 and swingably connected by pivot bolt 42 to the other link 43 of the operating linkage 39. The link 43 is bifurcated to receive the end of link 40 therein. Link 40 is non-linear in shape and has offsets adjacent its opposite ends so that the link 43 may swing with rotation of shaft 25 through approximately 180° and so that the link 40 will not interfere with the shaft 25. Link 43 is clamped rigidly to the shaft 25 at 43.1 so that the link 43 as well as shaft 25 rotates and slides relative to the frame 16.

Figure 7:
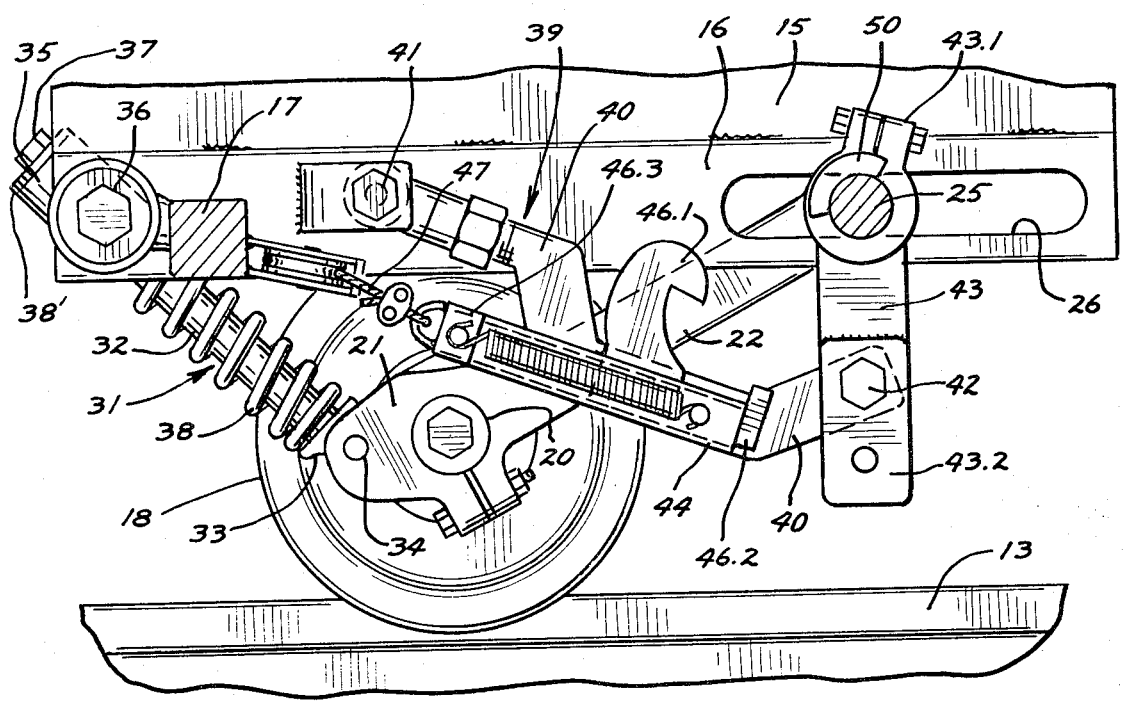
FIG. 7 is an enlarged detail section view similar to FIG. 6, but showing the flanged rail wheel in lowered position but with the latch released and without the substantial pressure applied by the spring.

The position of the linkage 39 illustrated in FIG. 7 is an intermediate position wherein the guide wheel 18 has been merely lowered to the rail 13, but not locked into lowered position. The guide wheel 18 is locked into its lowered position by swinging the link 43 and shaft 25 counterclockwise from the position illustrated in FIG. 7 to the position shown in FIG. 6, whereupon the shaft 25 is moved to the left along the slot 26 and the articulated linkage 22, 31 is fully extended in a downward direction, in FIG. 6.

It should be recognized that, in FIG. 6, the operating linkage 39 has assumed an over-center relationship so as to positively assure that the lowered and locked position of the guide wheel 18 will be maintained. The over-center relationship is along the centers of pivots 42 and 41 and shaft 25. Although there is pressure on shaft 25, tending to move it forwardly and away from the slide bearing 35, the over-center relationship which is established in the operating linkage 39 maintains the operating linkage in the position shown in FIG. 6.

In addition to the over-center relationship, an actual latch is provided for assisting in the holding of the articulated wheel mounting linkage 22, 31 in fully downwardly extending position. The latching mechanism includes a square rigid tube 44 affixed as by welding to the operating link 40 and having a slot 45 all along its top wall. A slide 46 is confined within the square tube 44 and has a hook-shaped retainer 46.1 protruding upwardly therefrom. A latching abutment 46.2 is also a part of the slide 46 and protrudes from the end of the tube 44. An operating head 46.3 extends from the opposite end of tube 44 and normally bears against the end of tube 44. A release cable 47 is affixed to the head 46.3 of the slide for operating the slide to release the latching mechanism. Cable 47 is trained over a pulley 48 and connects to the slide from the other latching mechanism adjacent the other flanged drive wheel 18 and operating handle 49 which may be pulled to slide the cable 47, will cause the slide 46 to move in the tube 44 for releasing the latch.

As a part of the latching mechanism, a keeper lug 50 is affixed as by welding to the shaft 25 adjacent the link 43, and the lug 50 will cam beneath the hook-shaped latch member 46.1, as illustrated in FIG. 6, when the over-center position previously described is attained in the operating linkage 39. As a result of hook 46.1, the lug 50 and shaft 25 are prevented from rotating clockwise in FIG. 6 and thereby the shaft 25 is prevented from sliding forwardly along the slot 26 which would tend to release the downward pressure on guide wheel 18. Link 43 also has an extension 43.2 extending beyond the pivot 42 which serves as a keeper to cooperate with the latch 46.2 when the link 43 is swung with shaft 25 into the position illustrated in FIG. 8 wherein the flanged guide wheel has been raised off the track 13. It will be recognized that in this position illustrated in FIG. 8, the shaft 25 has moved forwardly to the extreme end of slot 26 in frame 16.

Figure 8:
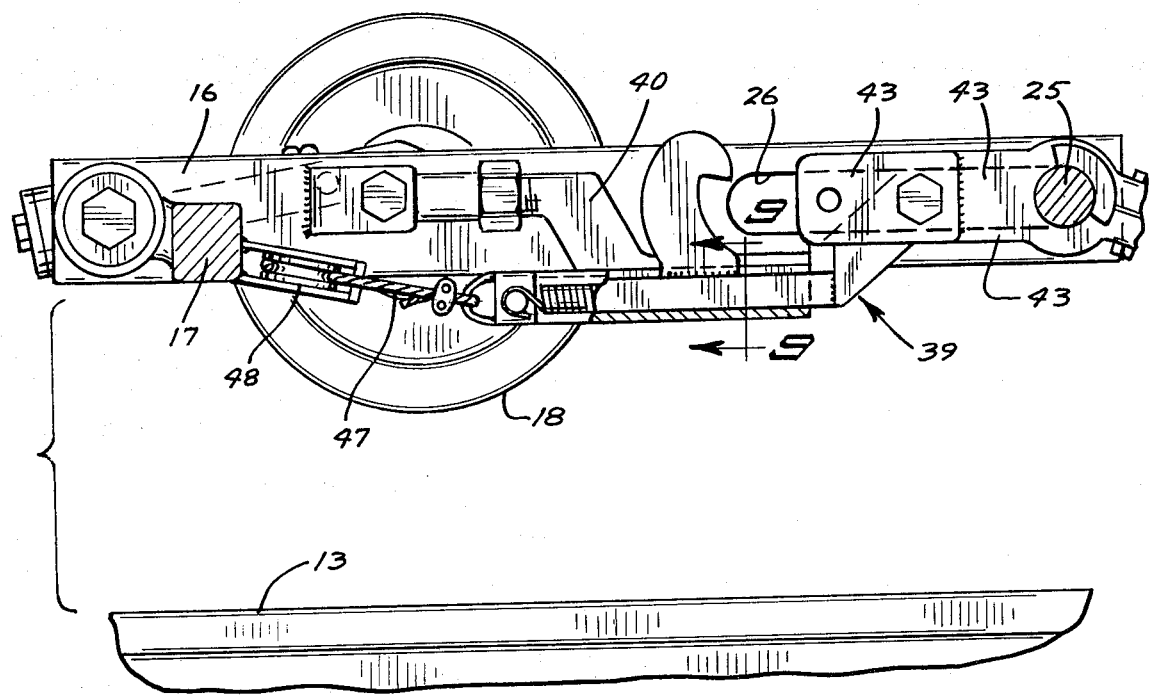
FIG. 8 is another enlarged detail section view similar to FIG. 6 and showing the flanged rail wheel in raised or elevated position.
Figure 9:
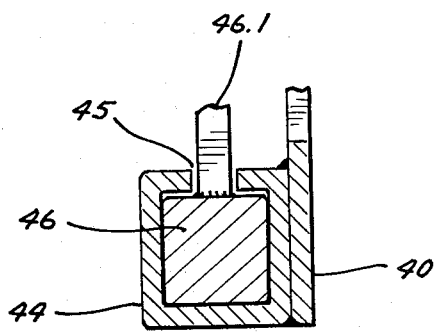
FIG. 9 is an enlarged detail section view taken approxiately at 9—9 in FIG. 8.

When the shaft is rotated in a clockwise direction from the position illustrated in FIG. 7 to the position illustrated in FIG. 8, the operating linkage 39 is extended so as to extend the distance between pivot 41 and shaft 25, and this tends to cause the lower end of links 22 and 31 to be raised upwardly. At the same time that the operating linkage 39 is being extended, rotation of shaft 25 causes lug 30 to engage the rigid flange 24 which directly causes the link or arm 22 and flanged guide wheel 18 to be swung upwardly toward the position illustrated in FIG. 8. The extended keeper portion 43.2 of link 43 will cam the end lug 46.2 out of the way and will then move above the lug 46.2 which thereupon serves as a latch to hold the operating linkage 39 in the condition illustrated in FIG. 8 and wherein the guide wheel 18 is in elevated position.

In summary, it will be apparent that, when the guide wheels 18 are in the elevated position illustrated in FIGS. 1, 2 and 8, the handle 49 will be pulled to move the cable 47 and release the latch, whereupon the flanged guide wheels may swing immediately to the rail 13. It is usually not necessary to use the crank arm 28 to rotate shaft 25 for swinging the guide wheels to the downward position. When the apparatus assumes the position illustrated in FIG. 7, wherein the guide wheel is merely resting upon the track 13 without applying any substantial downward pressure, the additional rotation of shaft 25 which is necessary to accomplish the locking of the guide wheel in its downward position and wherein pressure is applied constantly by the guide wheel downwardly against the track 13, the crank 28 must be used to rotate the shaft 25 from the position illustrated in FIG. 7 to the position illustrated in FIG. 6. When this rotation has been accomplished, the shaft will have moved along the slot to move the link 22 so that the link 31 assumes a more nearly vertical position. The operating mechanism 35 is latched into the position illustrated, whereupon the vehicle is ready to commence its travel along the tracks 13.

As the vehicle moves along the tracks, undulations in the contour of the tracks 13 is compensated by the upward and downward movement of the guide wheels with respect to the frame 16 of the attachment and frame 14 of the vehicle. A constant pressure is maintained downwardly on the track by the guide wheels 18 as a result of spring 38 continuously urging in a downward direction.

It will be seen that this invention provides a new and improved guide wheel assembly for use with passenger automobiles wherein an articulated linkage alternately moves the guide wheels downwardly into operative position and upwardly into position for highway travel. The articulated linkage is secured to the frame at one location, but is slidable along the frame at another location in order to effect the raising and lowering of the wheel. Operating linkage is provided for effecting the sliding of the wheel mounting linkage along the frame and latching mechanism will retain the articulated wheel mounting linkage in its desired position so as to hold the guide wheels in either their elevated highway travel position or their lowered rail travel position.

What is claimed is:

1. A guide wheel assembly for retaining the rubber tired support wheels of a highway vehicle on railroad tracks, comprising:

a frame attachable to the vehicle frame adjacent the support wheels;

a pair of widely spaced flanged guide wheels for guiding along the railroad tracks adjacent the vehicle support wheels;

means mounting said flanged wheels on the frame for downward and upward movement relative to the track and including an articulated linkage adjacent each of the flanged wheels, each of said articulated linkages having an articulated proximal portion intermediate the distal ends of the linkage and journaling the adjacent flanged wheel thereon, one of the distal ends of said linkage being swingably mounted on the frame, the other distal end of the linkage being swingably and slidably mounted on the frame, whereby to produce raising and lowering of the flanged wheel in response to sliding motion of said last mentioned end relative to the frame.

2. The guide wheel assembly according to claim 1 and said articulated linkage depending from the frame to locate the flanged guide wheels below the frame, and said articulated linkage being extendible and retractable to permit relative vertical movement between the frame and the flanged wheel without causing sliding of said slidable end of the linkage relative to the frame; and a spring on the linkage and continuously pressing the flanged wheel downwardly against the track.

3. The guide wheel assembly according to claim 1 and including an extensible and retractable operating linkage having one end swingably anchored to the frame and the other end connected to the slidable distal end of the articulated wheel mounting linkage, and said operating linkage including a swingable link alternately swingable in opposite directions to correspondingly and alternately extend and retract said operating linkage and to correspondingly and alternately slide the slidable distal end of the articulated linkage in opposite directions relative to the frame for raising and lowering the flanged guide wheel.

4. The guide wheel assembly according to claim 3 wherein said operating linkage includes a latching mechanism to releasably restrain the operating linkage in extended and retracted condition, respectively, for alternately retaining the flanged guide wheel in its alternate positions.

5. The guide wheel assembly according to claim 3 and there being a separate operating linkage associated with each of the articulated linkages, and a shaft extending between the separate operating linkages and interconnecting said swinging links to produce simultaneous raising and lowering of both flanged guide wheels.

6. The guide wheel assembly according to claim 5 and said shaft mounting the slidable distal ends of said flanged wheel mounting linkages, and said shaft being slidably mounted on said frame adjacent each of the flanged wheels.

7. The guide wheel assembly according to claim 6 wherein said swingable link is affixed to the shaft to rotate therewith, said swingable link rotating through approximately 180° between its extreme positions whereby widely spaced portions of said swingable link assume similar positions in the extended and retracted conditions of said operating linkage respectively, another of the links of the operating linkage having a single slide with latch means to engage said widely spaced portions of said swingable link for latching the same and retaining the operating linkage in its opposite positions, and a release cable connected to the slide for releasing said latch.

8. A guide wheel assembly for retaining the rubber tired support wheels of a highway vehicle on railroad tracks, comprising:

a frame attachable to the vehicle frame adjacent the support wheels;

a pair of widely spaced flanged guide wheels for guiding along the railroad tracks adjacent the vehicle support wheels;

swingable linkage means pivoted on the frame and mounting said wheels for guiding along the track and for swinging upwardly from the track; and slidable linkage means mounted on the frame for generally horizontal sliding along the frame and also being connected to the linkage means for producing upward and downward swinging thereof as the slidable linkage is moved along the frame.

9. The guide wheel assembly according to claim 8 and one of said linkage means being extensibly and resiliently yieldable to permit relative vertical movement between the flanged wheels and the frame.

10. The guide wheel assembly according to claim 8 and also including operating mechanisms extensible and retractable horizontally between the frame and the slidable linkage means and effecting raising and lowering of the flanged guide wheels.

11. The guide wheel assembly according to claim 9 and said swingable linkage means being resiliently retractable and extendible in a generally upward and downward direction to permit relative vertical movement between the flanged wheels and the frame.

12. The guide wheel assembly according to claim 10 and said slidable linkage means including a rotary shaft with ends extending through fore and aft oriented slots in the frame, and said operating mechanism including a two part articulated linkage with one part swingably mounted on the frame and the other part affixed on the shaft for rotation therewith and for moving the shaft along said slots to raise and lower the flanged wheels.

13. The guide wheel assembly according to claim 12 and including means for rotating said shaft, and a lug on said shaft and located adjacent said slidable linkage means for producing upward swinging thereof for raising the flanged guide wheel off the track.

14. A guide wheel assembly for retaining the rubber tired support wheels of a highway vehicle on railroad tracks, comprising:

rigid frame means for attachment to the vehicle frame adjacent the support wheels;

a pair of widely spaced flanged guide wheels for guiding along the railroad tracks adjacent the vehicle support wheels;

sub-frame means pivoted on said rigid frame means and mounting said guide wheels for upward and downward movement to permit alternate raising of the guide wheels off the tracks and lowering the guide wheels to the tracks, said sub-frame means including a pair of individually movable sub-frames, each having a sub-axle mounting a respective guide wheel and each sub-frame extending generally horizontally from the guide wheel to permit the guide wheel to move up and down to follow the undulations in the track;

spring means bearing against the sub-frame means and continuously urging the guide wheels downwardly against the track while allowing upward movement of an individual wheel to follow the track undulations without lifting the other wheel, said spring means including a coil compression spring encompassing a guide rod, one end of the rod and the corresponding end of the spring being connected to a bearing anchored on the sub-frame means adjacent the flanged wheel, a slide bearing pivotally mounted on the frame and slidably receiving said rod therethrough, the spring also being anchored against said slide bearing whereby to restrain upward movement of the flanged guide wheel and maintain a downward pressure on the flanged wheel; and operating means connected between the rigid frame means and the sub-frame means to lift the guide wheels off the tracks for highway travel.

15. A guide wheel assembly for retaining the rubber tired support wheels of a highway vehicle on railroad tracks, comprising:

a frame having elongate portions to be secured adjacent opposite sides of the vehicle and adjacent the support wheels, said elongate portions having elongate slots therein;

a pair of widely spaced flanged guide wheels to be disposed adjacent the support wheels of the vehicle for guiding the support wheels along the tracks;

a pair of two-part articulated wheel mounting linkages, each of said linkages having a proximal portion intermediate the distal ends and journaling a corresponding flanged wheel thereon, one part of each of said linkages being swingably connected to the frame and being resiliently retractable and extensible to prevent limited upward and downward movement of the flanged guide wheel relative to the frame for following undulations in the track, the other part of each of said linkages having the slidable distal end disposed adjacent the slot in the frame, a shaft extending between frames and through the slots thereof and being connected to said slidable distal ends of the two-part articulated wheel mounting linkage, said shaft being rotatable with respect to said linkages and having means thereon for revolving the shaft;

a two-part articulated operating linkage having one part affixed to said shaft for rotating therewith and having the other part anchored to the frame whereby to cause sliding movement of the shaft as the shaft is rotated and thereby raise and lower the flanged wheels simultaneously;

a latching mechanism on one of the parts of the operating linkage and engaging and restraining the other part of the operating linkage in alternate positions of the other part of the operating linkage; and a release cable connected to said latching mechanism for releasing the operating linkage in order to raise and lower the flange wheels.

\* \* \* \* \*